Nov. 3, 1931.  J. E. STONE  1,830,141
METHOD OF MAKING VULCANIZED SLABS HAVING CONTRASTINGLY COLORED SURFACES
Filed April 5, 1929
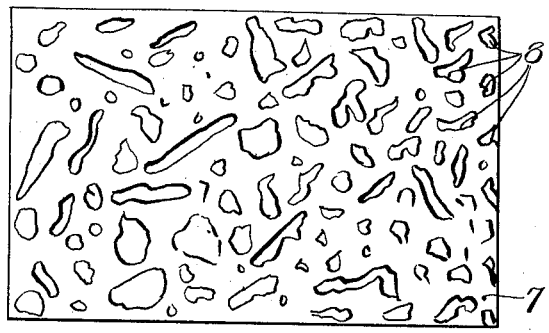
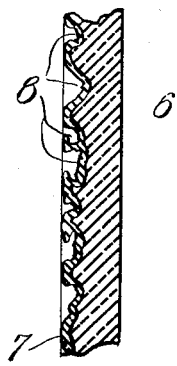
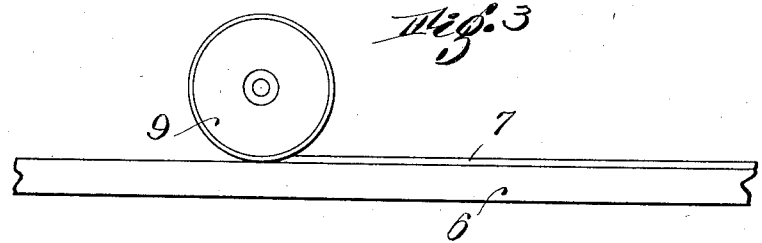
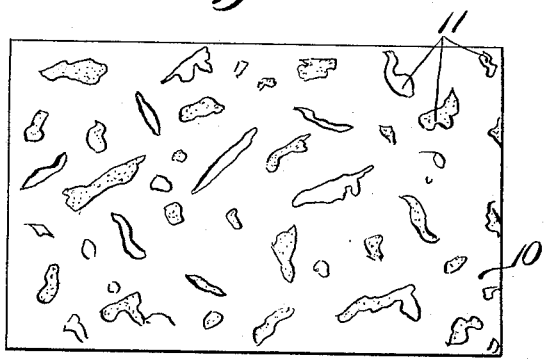
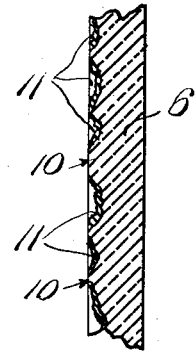

Patented Nov. 3, 1931

1,830,141

UNITED STATES PATENT OFFICE

JOSEPH EVERETT STONE, OF PROVIDENCE, RHODE ISLAND

METHOD OF MAKING VULCANIZED SLABS HAVING CONTRASTINGLY COLORED SURFACES

Application filed April 5, 1929. Serial No. 352,862.

This invention relates to the manufacture of molded tiling for floors, walls and ceilings, and pertains more particularly to improvements in the process of making slabs, blocks or tile of rubber or other semi-rigid material and to the resulting product. The principal object of the invention is to produce a tiling or slab having a relatively thick backing layer and a superposed thinner layer of differently colored material, the backing having recesses or indentations receiving the material of the facing layers, and then to grind off or otherwise remove a portion of the facing, whereby the resulting unified slab presents a two-colored surface having a mottled appearance simulating travertin. Further objects reside in the improved features of the process and product hereinafter described and defined in the appended claims.

A recommended process of making the improved tiling is illustrated in the accompanying drawings, in which:

Fig. 1 is a face view of the molded slab before grinding;

Fig. 2 is a sectional view of the slab;

Fig. 3 is a side view illustrating the grinding operation; and

Figs. 4 and 5 are views similar to Figs. 1 and 2 of the finished product.

The improved process consists essentially in providing a mold suitable for use in a hydraulic or other press, the mold having a raised pattern designed to produce the required indentations or surface deformations in the facing layer; loading the mold with a thin sheet of the facing material and partially vulcanizing the sheet in the mold; then applying the thicker and preferably softer backing layer, unvulcanized facing, and completely vulcanizing the two layers to form a unified laminated slab, such as illustrated in Figs. 1 and 2; and finally sanding, buffing, or grinding the uneven surface of the facing to produce the final product shown in Figs. 4 and 5, in which the material of the facing appears as irregular spots or blotches in the face of the backing.

The pattern mold may be prepared in any well-known manner and the vulcanizing apparatus may be any known type adapted to finish the required condition of temperature and pressure for the vulcanization of sheets of rubber or similar composition material. It is accordingly unnecessary to illustrate or particularly describe such apparatus.

In order to produce the required depressions in the vulcanized backing layer, the facing layer should be first loaded in the mold and partially vulcanized before the backing material is added, as aforesaid; otherwise the ridges of the mold will not properly force the facing into backing and the desired multicolored effect of the finished product will not be achieved.

In Figs. 1 and 2 the backing layer 6 is shown as lighter in color than the facing layer 7, but contrasting colors of any desired hue may be employed for the respective layers. In the unfinished stage of the slab the facing layer 7 has recesses of depressions 8 corresponding to the ridges of the mold, and the backing layer 6 has similar depressions which are formed during vulcanization by the partially vulcanized facing which covers said ridges. The thin facing layer is accordingly vulcanized into the depressions of the backing layer and covers the irregular upper surface of the laminated slab (Fig. 2).

The irregular projections of the facing are then removed as by the buffing roll 9 (Fig. 3) until substantial portions of the backing are exposed, as shown at 10, Figs. 4 and 5. The buffing or grinding may be sufficiently deep to produce the contrasting color effect desired for the particular use of the product, but obviously should not be carried to such an extent as to remove all the facing which is retained in the depressions of the backing 6. When the facing has been sanded or ground down to the plane of the backing as in Figs. 4 and 5, the color of the facing material appears as irregularly formed and spaced spots 11 upon the outer surface of the slab, thereby producing a unique and pleasing pattern in contrasting colors.

The finished slab may be cut or trimmed into blocks or tiles of the desired size for application to walls, floors or ceilings in the usual manner. The tiling thus provided is durable in use, light in weight, economical to manufacture, transport and apply, and may be formed of the desired material in a variety of lasting color combinations.

I claim:

1. A method of making vulcanized slabs having contrastingly colored surfaces, consisting in partially vulcanizing a thin facing sheet of colored material in a mold having ridges to produce indentations and projections in opposite sides of said sheet, vulcanizing a backing sheet of contrasting color upon one side of the facing sheet, and removing portions of the opposite side of the facing to expose portions of the backing between spots of the facing material on the surface of the resulting product.

2. A method of making vulcanized slabs having contrastingly colored surfaces, consisting in partially vulcanizing a relatively thin sheet of colored material in a mold having ridges to produce indentations and projections in opposite sides of the sheet, vulcanizing a relatively thick backing sheet of contrasting color upon one side of the facing sheet while in said mold and simultaneously completing the vulcanization of said facing to produce depressions in the backing sheet which are covered with the facing material, and removing the projecting face portions of the laminated slab to expose portions of the backing between spots of the facing material on the surface of the resulting product.

In testimony whereof I affix my signature.

J. EVERETT STONE.